United States Patent
Dudar et al.

(10) Patent No.: US 10,190,934 B2
(45) Date of Patent: Jan. 29, 2019

(54) SYSTEMS AND METHODS FOR ENGINE-OFF NATURAL VACUUM LEAK TESTING WITH FUEL ENABLEMENT COMPENSATION

(71) Applicant: Ford Global Technologies, LLC, Dearborn, MI (US)

(72) Inventors: Aed M. Dudar, Canton, MI (US); John Mullins, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 610 days.

(21) Appl. No.: 14/799,783

(22) Filed: Jul. 15, 2015

(65) Prior Publication Data

US 2017/0016795 A1    Jan. 19, 2017

(51) Int. Cl.
*G01M 3/02* (2006.01)
*F02M 25/08* (2006.01)

(52) U.S. Cl.
CPC ........ *G01M 3/025* (2013.01); *F02M 25/0818* (2013.01)

(58) Field of Classification Search
None
See application file for complete search history.

(56) References Cited

U.S. PATENT DOCUMENTS

| 5,263,462 | A | 11/1993 | Reddy |
| 6,283,098 | B1 | 9/2001 | Corkill |
| 6,321,727 | B1 | 11/2001 | Reddy et al. |
| 6,974,251 | B2 | 12/2005 | DeRonne et al. |
| 7,387,437 | B2 | 6/2008 | Brown et al. |
| 8,074,627 | B2 | 12/2011 | Siddiqui |
| 2009/0277251 | A1* | 11/2009 | Takakura ........... F02M 25/0809 73/40.7 |
| 2013/0297234 | A1 | 11/2013 | Criel et al. |
| 2014/0069394 | A1 | 3/2014 | Jentz et al. |
| 2014/0074385 | A1 | 3/2014 | Dudar et al. |
| 2014/0316638 | A1 | 10/2014 | Dudar et al. |
| 2016/0186695 | A1* | 6/2016 | Dudar ................ F02M 25/0809 73/40.5 R |

OTHER PUBLICATIONS

Tseng, Fling Finn et al., "Confidence-Modified Exponentially Weighted Moving Average Filter or Engine-Off Natural Vacuum Testing," U.S. Appl. No. 14/922,641, filed Oct. 26, 2015, 50 pages.

* cited by examiner

*Primary Examiner* — Daniel S Larkin
(74) *Attorney, Agent, or Firm* — Julia Voutyras; McCoy Russell LLP (57) ABSTRACT

Methods and systems are provided for increasing the robustness of engine off natural vacuum testing. In one example, following an engine-off event, a heat rejection inference is determined, and further adjusted based on a fuel level and ambient temperature. In this way, an evaporative emissions system leak test may be enabled under conditions where the leak test may otherwise not be executed, thus increasing opportunities for evaporative emissions system leak detection and correspondingly reducing bleed emissions.

11 Claims, 5 Drawing Sheets

SYSTEMS AND METHODS FOR ENGINE-OFF NATURAL VACUUM LEAK TESTING WITH FUEL ENABLEMENT COMPENSATION

FIELD

The present description relates generally to methods and systems for controlling a vehicle engine to increase robustness of EONV leak testing.

BACKGROUND/SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere. Evaporative leaks may be identified using engine-off natural vacuum (EONV) during conditions when a vehicle engine is not operating. In particular, a fuel system may be isolated at an engine-off event. The pressure in such a fuel system will increase if the tank is heated further (e.g., from hot exhaust or a hot parking surface) as liquid fuel vaporizes. As a fuel tank cools down, a vacuum is generated therein as fuel vapors condense to liquid fuel. Vacuum generation is monitored and leaks identified based on expected vacuum development or expected rates of vacuum development.

In order to preserve battery charge, a typical EONV test is subject to a time limit. A failure to reach a pressure or vacuum threshold before the end of the time limit may result in degradation being indicated, even if the fuel system is intact. For example, the pressure rise portion of the test may execute until the fuel tank pressure curve reaches a zero-slope. If the pressure rise has a relatively low rate of constant increase (e.g., due to cool ambient conditions counteracting the pressure increase), and a significant amount of the time limit elapses prior to a zero-slope moment, the subsequent vacuum test may fail based on the limited amount of time remaining, regardless of the state of the fuel system.

Further, the entry conditions and thresholds for a typical EONV test are based on an inferred total amount of heat rejected into the fuel tank during the prior drive cycle. The inferred amount of heat may be based on engine run-time, integrated mass air flow, miles driven, etc. However, the amount of heat energy transfer needed to reliably assess the integrity of a fuel tank is significantly dependent on the level of fuel in the tank.

One approach for enabling entry into an EONV leak test based on a fuel level is taught by Reddy et al in U.S. Pat. No. 6,321,727 B1. Therein, the EONV test is enabled only when the fuel level is between 15% and 85% of the tank capacity. This fuel level range is specified in order to ensure a suitable vapor volume that is productive of data useful for the diagnostic leak test. Further, ambient temperature is specified to be above 40° F. and fuel tank temperature is specified to be a defined threshold temperature above ambient temperature. If these conditions are not met, the entry into the leak test is aborted. However, while thresholds for fuel tank temperature, ambient temperature, and fuel level are specified for enabling entry into a leak test, the thresholds are static, rather than dynamic, and may thus not always be optimal based on the sum total of current operating conditions. For example, if the level of fuel is near the upper-end of the threshold, yet ambient temperature and fuel tank temperature are near the bottom-end of the threshold, entry into the leak test may be enabled under sub-optimal conditions, potentially resulting in a false test failure. Alternatively, under circumstances wherein fuel is at a level just below threshold yet ambient temperature and fuel tank temperature are significantly above the threshold, entry into leak test may not be enabled even though the likelihood of a robust leak test is high.

The inventors herein have recognized the above issues, and have developed systems and methods to at least partially address them. In one example, a method is provided, comprising, following a vehicle-off event, determining a heat rejection inference for an engine run time duration, and adjusting a heat rejection inference entry threshold based on a current fuel level and a current ambient temperature. For example, a full fuel tank may require a greater heat rejection inference to enable entry into an EONV test than a partially full fuel tank. In this way, EONV tests may be enabled more often than for systems using a relatively high heat rejection threshold, thus maximizing In Use Monitoring Performance (IUMP) rates.

In another example, a method is provided, comprising responsive to and engine heat rejection inference being greater than an adjusted heat rejection inference entry threshold, adjusting one or more pressure thresholds for an engine-off natural vacuum test based on the determined heat rejection inference, isolating the fuel system from atmosphere, and indicating degradation of the fuel system based on the one or more adjusted pressure thresholds. In this way, the leak test parameters may be more indicative of the current operating conditions, decreasing the likelihood of false failures compared to systems using a relatively low heat rejection threshold.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
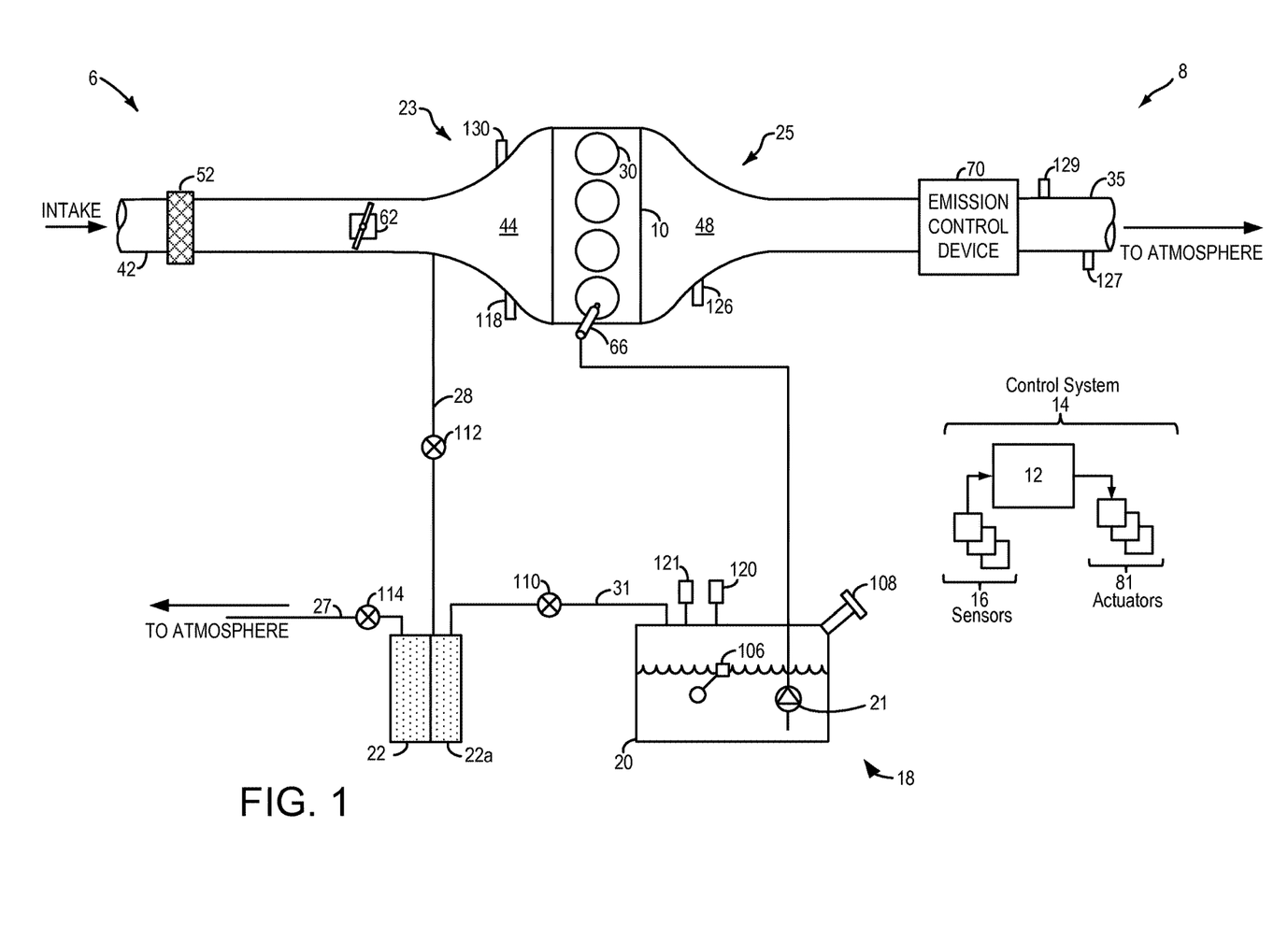
FIG. 1 schematically shows a fuel system and an emissions system for an example vehicle engine.
Figure 3:
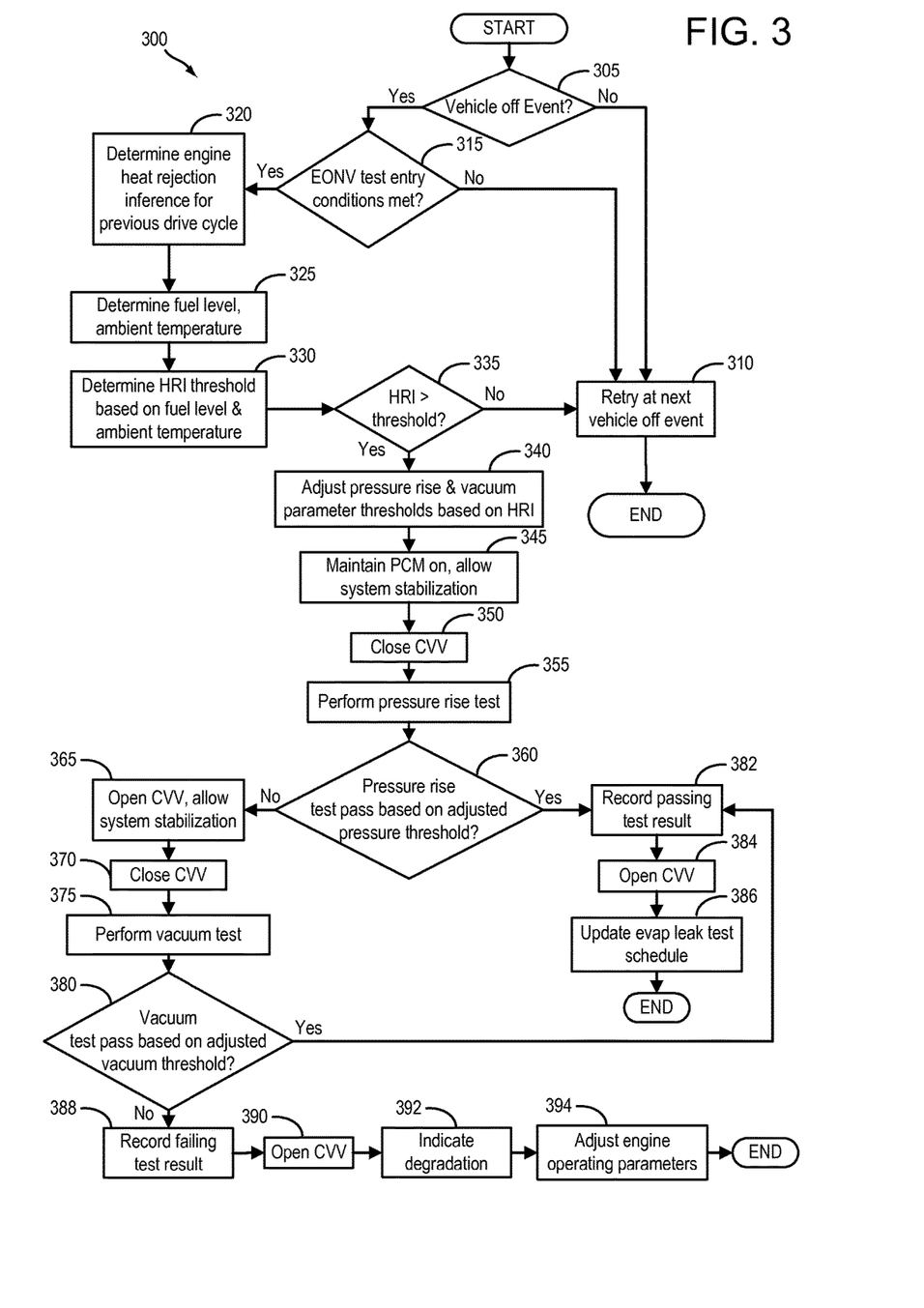
FIG. 3 shows an example method for performing an evaporative emissions leak test where entry conditions are based on a heat rejection inference as a function of fuel level and ambient temperature.
Figure 4:
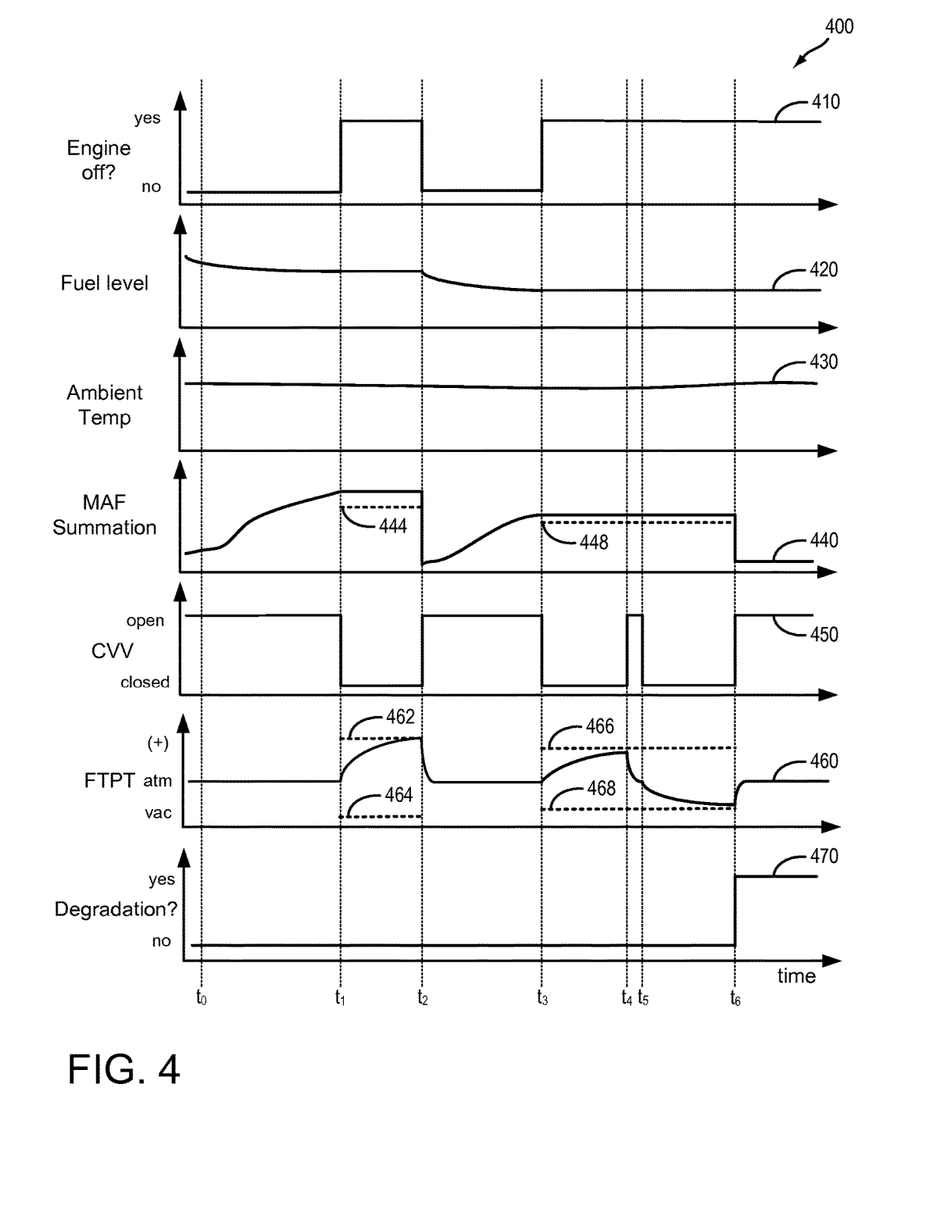
FIG. 4 shows a timeline for an example evaporative emissions leak testing procedure using the method of FIG. 3.

The following detailed description relates to systems and methods for evaporative emissions system leak testing. More specifically, the description relates to adjusting entry conditions, and parameters for executing an engine-off natural vacuum (EONV) test. The evaporative emission system may be coupled to a fuel system and an engine, as depicted in FIG. 1. Following a drive cycle, entry into an EONV test may be based on heat rejection, typically inferred by engine parameters such as total air mass consumed by the engine, miles driven, engine run time, etc. If adequate heat rejection is inferred, EONV runs. However the amount of fuel in the tank also affects heat rejection. For example, a fuel tank at capacity takes longer to heat as compared to a fuel tank with a low level of fuel. Thus a threshold heat rejection for entry into EONV may not accurately reflect the likelihood of a robust EONV test, if heat rejection thresholds do not account for fuel level. For example, a heat rejection threshold calibrated for low fuel levels may thus enable entry into EONV under situations where fuel level is actually high, thus resulting in a false EONV test failure, indicated in the time plot of FIG. 2A. Alternatively, if a heat rejection threshold is calibrated based on a high fuel level, entry into EONV may not be enabled for situations wherein fuel level is low, as shown in the time plot FIG. 2B. A method for entry into EONV that determines heat rejection, and further adjusts the heat rejection threshold based on a function of fuel level and ambient temperature, is depicted in FIG. 3. Further, based on the indicated heat rejection compared to the adjusted heat rejection threshold, pressure rise and vacuum parameter thresholds may be adjusted accordingly in order to increase robustness of the EONV leak test procedure. A timeline for conducting an EONV leak test incorporating these concepts is shown in FIG. 4.

FIG. 1 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via an air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), the canister and the buffer each comprising the adsorbent. As shown, the volume of buffer 22a may be smaller than (e.g., a fraction of) the volume of canister 22. The adsorbent in the buffer 22a may be the same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid. In some examples, an air filter may be coupled in vent 27 between canister vent valve 114 and atmosphere.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20. The fuel system may be considered to be sealed when isolation valve 110 is closed. In embodiments where the fuel system does not include isolation valve 110, the fuel system may be considered sealed when purge valve 112 and canister vent valve 114 are both closed.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by MAF sensor 130 coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include heated exhaust gas oxygen sensor (HEGO) 126 located upstream of the emission control device, catalyst monitor sensor (CMS) 127 located downstream of the emission control device, MAP sensor 118, fuel tank pressure sensor 120, MAF sensor 130, and exhaust pressure sensor 129. Other sensors such as additional pressure, temperature, air/fuel ratio, and composition sensors may be coupled to various locations in the vehicle system 6. For example, ambient temperature and pressure sensors may be coupled to the exterior of the vehicle body. As another example, actuators 81 may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regard to FIG. 3.

Controller 12 may also be configured to intermittently perform leak detection routines on fuel system 18 (e.g., fuel vapor recovery system) to confirm that the fuel system is not degraded. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Leak tests performed while the engine is not running may include sealing the fuel system following engine shut-off and monitoring a change in fuel tank pressure. Sealing the fuel system may comprise isolating the fuel system from atmosphere via the closing of one or more valves (e.g., the FTIV, CVV, and/or CPV). This type of leak test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values that would occur for a system with no leaks, and/or for a system with leaks of a predetermined size. Following a vehicle-off event, as heat continues to be rejected from the engine into the fuel tank, the fuel tank pressure will initially rise. During conditions of relatively high ambient temperature, a pressure build above a threshold may be considered a passing test.

However, entry conditions and thresholds for a typical EONV test are based on an inferred total amount of heat rejected into the fuel tank during the prior drive cycle. Table 1 shows an example set of entry conditions for an EONV test, where a minimum air mass summation is based on ambient temperature.

TABLE 1

| Ambient Temperature (° F.) | Air Mass Summation Entry Condition (lbs) |
|---|---|
| 40 | 15000 |
| 50 | 13500 |
| 60 | 12000 |
| 75 | 10000 |
| 90 | 8500 |
| 100 | 7000 |

By accounting for ambient temperature, the air mass summation entry condition is adjusted so that scenarios where the fuel is cold (e.g., low ambient temperature) require additional heat energy to be rejected into the fuel tank (greater air mass summation), thus preventing false failures which may otherwise occur if the fuel does not reach a temperature where significant fuel vapor is generated. However, such a set of entry conditions does not account for the amount of fuel in the fuel tank, despite the fact that the amount of heat rejection needed to bring a quantity of fuel to a threshold temperature correlates with the quantity of fuel. The entry conditions in Table 1 are calibrated for a certain quantity (or range of quantities) of fuel within the fuel tank, but the actual quantity of fuel may vary. As such, a heat rejection threshold calibrated based on a relatively high level of fuel in a fuel tank, may not initiate an EONV test under circumstances which may in fact be suitable for performing the EONV test, such as a relatively low fuel level and a sub-threshold amount of heat rejection. If the heat rejection threshold is calibrated based on a relatively low level of fuel in the tank, entry into an EONV test may be enabled, but the test may wrongly indicate a failing result due to a high level of fuel in the tank not being heated to the extent required for a robust EONV test.

Figure 2A:
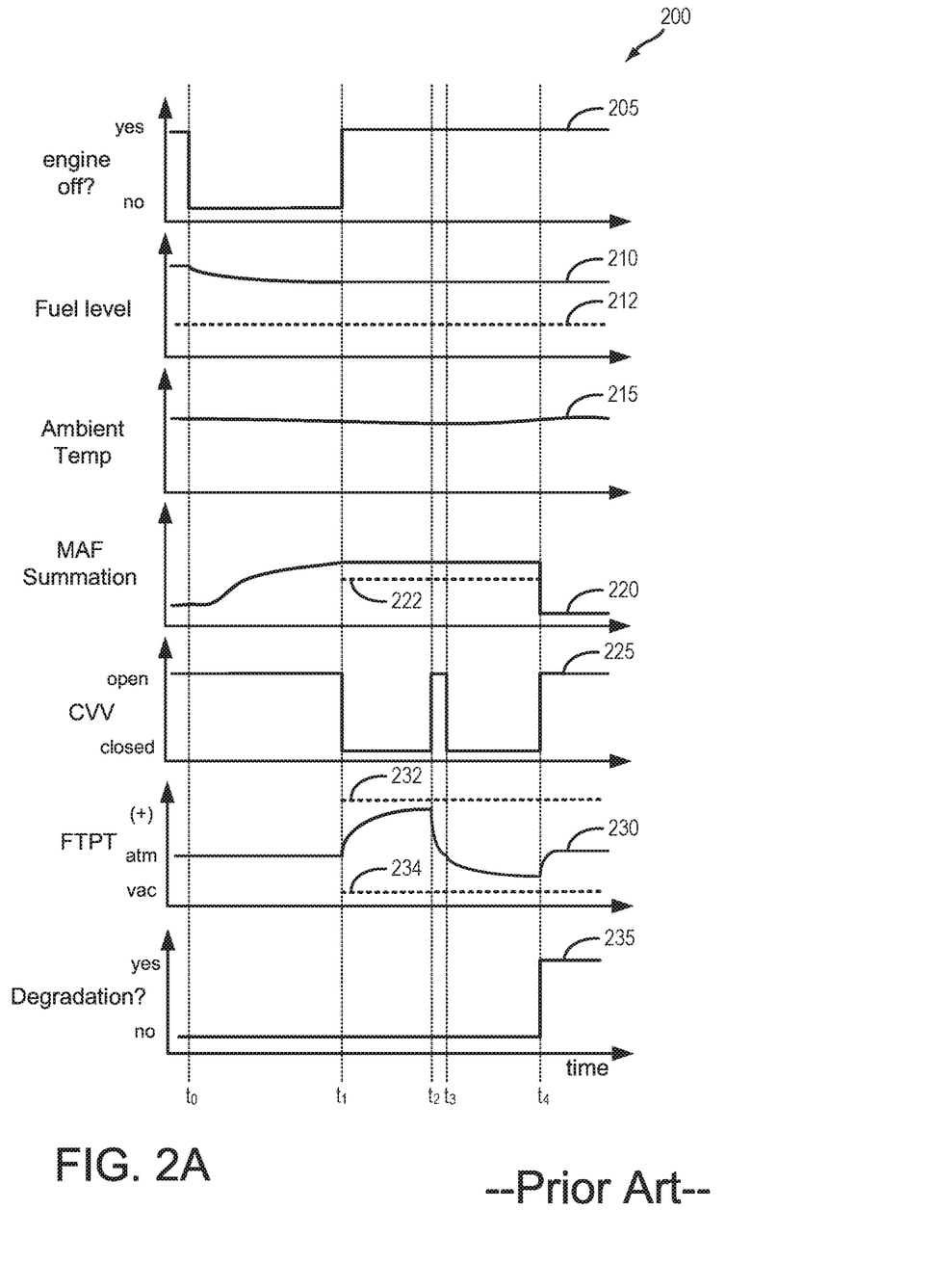
FIG. 2A shows an example timeline for an engine-off natural vacuum test on an intact fuel tank for which a failing result is wrongly indicated.

For example, FIG. 2A shows an example timeline 200 for an EONV test on an intact fuel tank which falsely fails due to the fact that MAF summation entry threshold, a measure of heat rejection, was calibrated to favor a low fuel level. Timeline 200 includes plot 205, indicating the on or off state of a vehicle engine, and plot 210, indicating fuel level, over time. Line 212 represents a fuel level for which the MAF summation entry threshold was calibrated. Timeline 200 further includes plot 215, indicating ambient temperature, and plot 220 indicating MAF summation, over time. Line 222 represents a threshold MAF summation above which entry into an EONV leak test is enabled. Timeline 200 further includes plot 225, indicating the open or closed status of a canister vent valve over time. Timeline 200 further includes plot 230, indicating the fuel tank pressure as monitored by an FTPT (fuel tank pressure transducer) over time. Line 232 represents a threshold for the pressure rise portion of an EONV test. Line 234 represents a vacuum threshold for the vacuum portion of an EONV test. Timeline 200 further includes plot 235, indicating whether degradation is indicated.

At time $t_0$ the vehicle is in operation and the engine is turned on, as indicated by plot 205. Between time $t_0$ and $t_1$, as the vehicle is in operation, fuel level decreases, indicated by plot 210, and MAF summation increases, indicated by plot 220. At time $t_1$ the vehicle is turned off. As the MAF summation threshold, indicated by line 222, was calibrated based on a low fuel level, indicated by line 212, and ambient temperature is high, the MAF summation at time $t_1$ is above the threshold. Accordingly, entry conditions for the EONV test are met, and the canister vent valve is closed, as indicated by plot 225. Between time $t_1$ and $t_2$ pressure builds in the fuel tank, but does not reach the pressure threshold, represented by line 232. The pressure threshold was not reached as the threshold was calibrated based on a low fuel level, yet the fuel level is high. Accordingly, at time $t_2$ the canister vent valve is opened to equilibrate systemic pressure, and between $t_2$ and $t_3$ fuel tank pressure returns to atmospheric pressure. As the pressure threshold was not reached in the pressure rise portion of the EONV test, the canister vent valve is closed at time $t_3$, and the vacuum portion of the EONV test begins. Between time $t_3$ and $t_4$ the fuel tank pressure decreases, but does not reach the vacuum threshold, represented by line 234. The vacuum threshold was not reached as the threshold was calibrated based on a low fuel level, yet the fuel level is high. Accordingly, a leak is indicated at time $t_4$, indicated by plot 235, the canister vent valve is opened, and MAF summation returns to baseline as the EONV test is over.

Figure 2B:
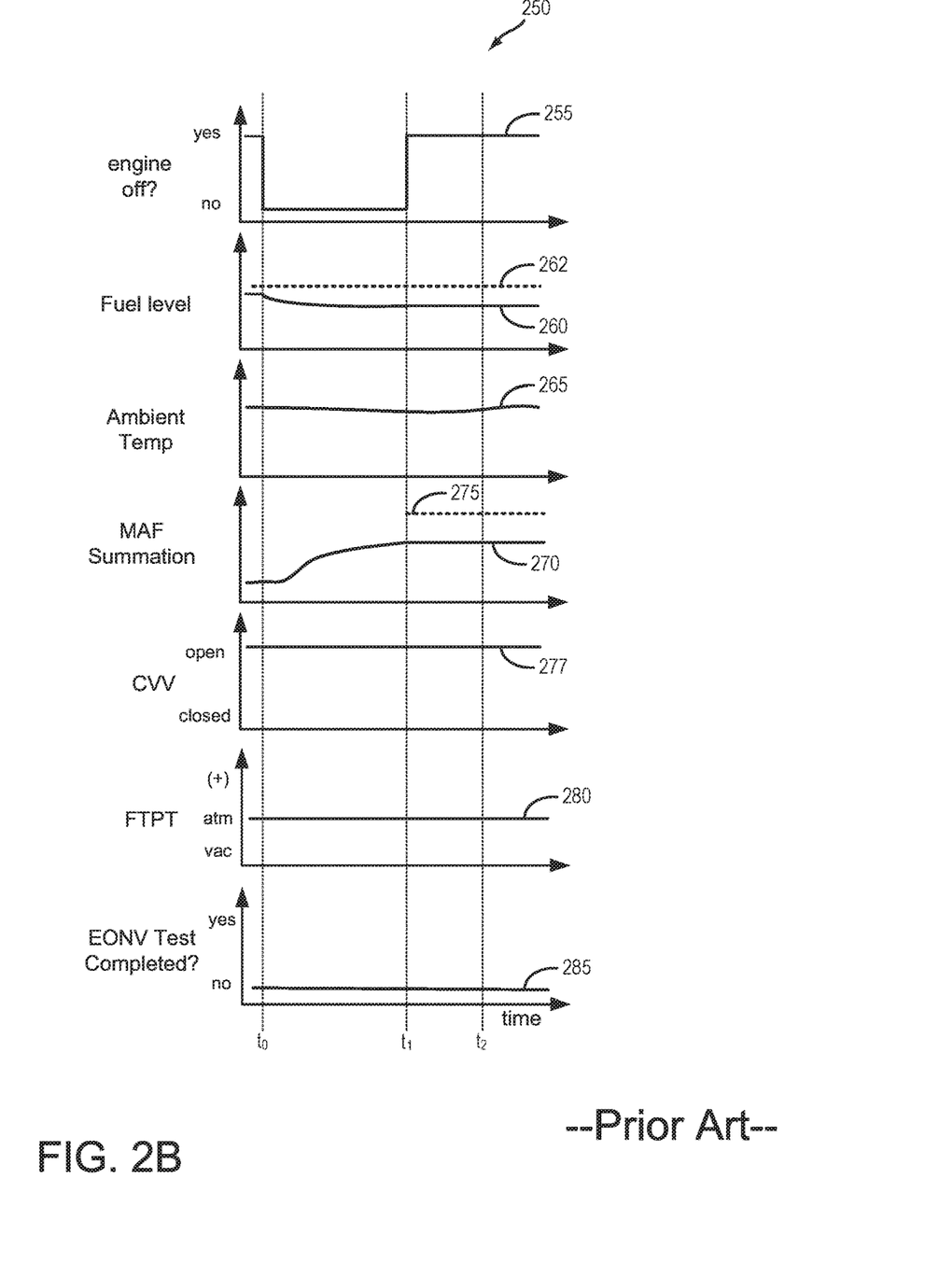
FIG. 2B shows an example timeline for a scenario wherein entry into an engine-off natural vacuum test is not enabled.

FIG. 2B shows an example timeline 250 for vehicle operation in which MAF summation is calibrated to favor a high fuel level thus resulting in a scenario where an EONV leak test is not run when vehicle fuel level is low. Timeline 250 includes plot 255 indicating the on or off state of a vehicle engine, and plot 260, indicating fuel level, over time. Line 262 represents a fuel level for which the MAF summation entry threshold was calibrated. Timeline 250 further includes plot 265, indicating ambient temperature, and plot 270 indicating MAF summation, over time. Line 275 represents a threshold MAF summation above which entry into an EONV leak test is enabled. Timeline 200 further includes plot 277, indicating the open or closed status of a canister vent valve over time. Timeline 200 further includes plot 280, indicating the fuel tank pressure as monitored by an FTPT (fuel tank pressure transducer) over time. Timeline 250 further includes plot 285, indicating whether an EONV test is completed.

At time $t_0$ the vehicle is in operation and the engine is turned on, as indicated by plot 255. Between time $t_0$ and $t_1$, as the vehicle is in operation, fuel level decreases, indicated by plot 260, and MAF summation increases, indicated by plot 270. At time $t_1$ the vehicle is turned off. As the MAF summation threshold, indicated by line 275, was calibrated based on a high fuel level, indicated by line 262, even though ambient temperature is high, the MAF summation at time $t_1$ is below the threshold. Accordingly, entry into the EONV leak test is not enabled, indicated by the canister vent valve remaining open. Between time $t_1$ and $t_2$, the canister vent valve remains open, the FTPT measures atmospheric pressure, and the EONV test, is not completed, as shown by plot 285.

As indicated in FIGS. 2A and 2B, the consequences of calibrating heat rejection thresholds for entry into EONV testing without accounting for the level of fuel in the fuel tank at the time of EONV entry include false failures and missed opportunities for EONV enablement. Accordingly, by adjusting heat rejection thresholds as a function of fuel level and ambient temperature, EONV tests may be enabled more frequently, and false failures may be reduced.

FIG. 3 depicts a high-level example method 300 for an engine-off natural vacuum test for a vehicle where a threshold for entry into a leak test is adjusted based on at least a fuel level. Method 300 will be described with reference to the system depicted in FIG. 1, but it should be understood that similar methods may be used with other systems without departing from the scope of this disclosure. Method 300 may be carried out by a controller, such as controller 12, and may be stored as executable instructions in non-transitory memory.

Method 300 begins at 305. At 305, method 300 includes determining whether a vehicle-off event has occurred. The vehicle-off event may include an engine-off event, and may be indicated by other events, such as a key-off event. The vehicle-off event may follow a vehicle run time duration, the vehicle run time duration commencing at a previous vehicle-on event. If no vehicle-off event is detected, method 300 proceeds to 310. At 310, method 300 includes recording that an EONV test was not executed, and further includes setting a flag to retry the EONV test at the next detected vehicle-off event. Method 300 then ends.

If a vehicle-off event is detected, method 300 proceeds to 315. At 315, method 300 includes determining whether entry conditions for an EONV test are met. For an engine-off natural vacuum test, the engine must be at rest with all cylinders off, as opposed to engine operation with the engine rotating, even if one or more cylinders are deactivated. Further entry conditions may include a threshold amount of time passed since the previous EONV test, a threshold length of engine run time prior to the engine-off event, a threshold amount of fuel in the fuel tank, and a threshold battery state of charge. If entry conditions are not met, method 300 proceeds to 310. At 310, method 300 includes recording that an EONV test was not executed, and further includes setting a flag to retry the EONV test at the next detected vehicle-off event. Method 300 then ends.

Although entry conditions may be met at the initiation of method 300, conditions may change during the execution of the method. For example, an engine restart or refueling event may be sufficient to abort the method at any point prior to completing method 300. If such events are detected that would interfere with the performing of method 300 or the interpretation of results derived from executing method 300, method 300 may proceed to 310, record that an EONV test was aborted, and set a flag to retry the EONV test at the next detected vehicle-off event, and then end.

If entry conditions are met, method 300 proceeds to 320. At 320, method 300 includes determining a heat rejection inference (HRI) between the most recent vehicle-off event and the previous vehicle-on event, also referred to as the previous drive cycle. In one example, the HRI may be based on an amount of heat rejected by the engine during the previous drive cycle, the timing of the heat rejected, the length of time spent at differing levels of drive aggressiveness, ambient conditions, etc. The heat rejected by the engine may be inferred based on or more of engine load, fuel injected summed over time, intake manifold air mass summed over time, miles driven, etc.

At 325, method 300 includes determining an ambient temperature and a fuel level. The ambient temperature may be estimated, inferred, and/or measured via an ambient temperature sensor, retrieved from an off-board weather server, etc. Fuel level may be determined by a fuel level sensor, located in the fuel tank, and may comprise a float connected to a variable resistor, such as fuel level sensor 106 depicted in FIG. 1. Alternatively, other types of fuel level sensors may be used.

At 330, method 300 includes determining a heat rejection inference (HRI) threshold. In one example, a 3D lookup table stored in the PCM may be used to adjust the HRI threshold based on the level fuel in the fuel tank and the ambient temperature. In other words, adjusting an engine heat rejection inference entry threshold may comprise retrieving a 3D lookup table stored in a powertrain control module. The HRI threshold may thus represent a value for which an executed EONV leak test is likely to provide robust results. Table 2 shows an example 3D lookup table. Therein, for a given ambient temperature (° F.), a fuel tank with a higher fill level (FLI) requires a greater amount of air mass summation (lbs.) during the previous drive cycle to meet the HRI threshold. In other words, adjusting the HRI threshold may comprise decreasing the engine HRI entry threshold as fuel level decreases, and increasing the engine HRI entry threshold as ambient temperature decreases.

TABLE 2

|  | 40° F. | 50° F. | 60° F. | 75° F. | 90° F. | 100° F. |
|---|---|---|---|---|---|---|
| 15% (FLI) | 20500 (lbs) | 20000 | 19500 | 19000 | 18500 | 18000 |
| 35% | 21500 | 21000 | 20500 | 20000 | 19500 | 19000 |
| 65% | 23000 | 22000 | 21500 | 21000 | 20500 | 20000 |
| 85% | 25000 | 24000 | 24000 | 22000 | 21000 | 21000 |

Continuing at 335, method 300 includes determining whether the HRI, as indicated at 320, is greater than or equal to the threshold value, indicated at 330. If the HRI is not greater than or equal to a threshold, method 300 proceeds to 310. At 310, method 300 includes recording that an EONV test was not executed, and further includes setting a flag to retry the EONV test at the next detected vehicle-off event. Method 300 then ends.

If it is determined that HRI is greater than or equal to a threshold at 335, method 300 proceeds to 340. At 340, method 300 includes adjusting pressure rise and vacuum parameter thresholds based on the measured HRI compared to the threshold HRI. For example, a measured HRI that is significantly greater than the threshold HRI may result in an increase in the absolute values of the pressure and vacuum thresholds for the EONV test. In other words, adjusting one or more pressure thresholds for an engine-off natural vacuum test based on the engine HRI may comprise indicating a difference between a measured engine HRI and an adjusted engine HRI entry threshold, and adjusting the one or more pressure thresholds based on a magnitude of the indicated difference.

Continuing at 345, method 300 includes maintaining the PCM on following the engine-off and/or vehicle off condition. In this way, the method may continue to be carried out by a controller, such as controller 12, and the EONV test may be initiated. Method 300 further includes allowing the fuel system to stabilize following the engine-off condition. Allowing the fuel system to stabilize may include waiting for a period of time before method 300 advances. The stabilization period may be a pre-determined amount of time, or may be an amount of time based on current operating conditions. The stabilization period may be based on the predicted ambient conditions. In some examples, the stabilization period may be characterized as the length of time necessary for consecutive measurements of a parameter to be within a threshold of each other. For example, fuel may be returned to the fuel tank from other fuel system components following an engine off condition. The stabilization period may thus end when two or more consecutive fuel level measurements are within a threshold amount of each other, signifying that the fuel level in the fuel tank has reached a steady-state. In some examples, the stabilization period may end when the fuel tank pressure is equal to atmospheric pressure. Following the stabilization period, method 300 then proceeds to 350.

At 350, method 300 includes closing a canister vent valve (CVV). Additionally or alternatively, a fuel tank isolation valve (FTIV) may be closed where included in the fuel system. In this way, the fuel tank may be isolated from atmosphere. The status of a canister purge valve (CPV) and/or other valves coupled within a conduit connecting the fuel tank to atmosphere may also be assessed and closed if open. Method 300 then proceeds to 355.

At 355, method 300 includes performing a pressure rise test. While the engine is still cooling down post shut-down, there may be additional heat rejected to the fuel tank. With the fuel system sealed via the closing of the CVV, the pressure in the fuel tank may rise due to fuel volatizing with increased temperature. The pressure rise test may include monitoring fuel tank pressure for a period of time. Fuel tank pressure may be monitored until the pressure reaches the adjusted threshold, the adjusted threshold pressure indicative of no leaks above a threshold size in the fuel tank. In some examples, the rate of pressure change may be compared to an expected rate of pressure change. The fuel tank pressure may not reach the threshold pressure. Rather, the fuel tank pressure may be monitored for a predetermined amount of time, or an amount of time based on the current conditions. The fuel tank pressure may be monitored until consecutive measurements are within a threshold amount of each other, or until a pressure measurement is less than the previous pressure measurement. The fuel tank pressure may be monitored until the fuel tank temperature stabilizes. Method 300 then proceeds to 360.

At 360, method 300 includes determining whether the pressure rise test ended due to a passing result, such as the fuel tank pressure reaching the adjusted pressure threshold. If the pressure rise test resulted in a passing result, method 300 proceeds to 382. At 382, method 300 includes indicating the passing test result. Indicating the passing result may include recording the successful outcome of the leak test at the controller. Continuing at 384, method 300 includes opening the canister vent valve. In this way, the fuel system pressure may be returned to atmospheric pressure. Continuing at 386, method 300 includes updating the evaporative emissions leak test schedule. For example, scheduled leak tests may be delayed or adjusted based on the passing test result. Method 300 then ends.

If a passing result is not indicated based on the adjusted pressure threshold, method 300 proceeds to 365. At 365, method 300 includes opening the CVV and allowing the system to stabilize. Opening the CVV allows the fuel system pressure to equilibrate to atmospheric pressure. The system may be allowed to stabilize until the fuel tank pressure reaches atmospheric pressure, and/or until consecutive pressure readings are within a threshold of each other. Method 300 then proceeds to 370.

At 370, method 300 includes closing the CVV. In this way, the fuel tank may be isolated from atmosphere. As the fuel tank cools, the fuel vapors should condense into liquid fuel, creating a vacuum within the sealed tank. Continuing at 375, method 300 includes performing a vacuum test. Performing a vacuum test may include monitoring fuel tank pressure for a duration. Fuel tank pressure may be monitored until the vacuum reaches the adjusted threshold, the adjusted threshold vacuum indicative of no leaks above a threshold size in the fuel tank. In some examples, the rate of pressure change may be compared to an expected rate of pressure change. The fuel tank pressure may not reach the threshold vacuum. Rather, the fuel tank pressure may be monitored for a predetermined duration, or a duration based on the current conditions.

Continuing at 380, method 300 includes determining whether a passing result was indicated for the vacuum test based on the adjusted threshold. If a passing result is indicated, method 300 proceeds to 382. At 382, method 300 includes indicating the passing test result. Indicating the passing result may include recording the successful outcome of the leak test at the controller. Continuing at 384, method 300 includes opening the canister vent valve. In this way, the fuel system pressure may be equilibrated to atmospheric pressure. Continuing at 386, method 300 includes updating the evaporative emissions leak test schedule. For example, scheduled leak tests may be delayed or adjusted based on the passing test result. Method 300 then ends.

Returning to 380, if the vacuum test did not result in a passing result, method 300 proceeds to 388. At 388, method 300 includes recording the failing test result. Indicating the failing result may include recording the unsuccessful outcome of the leak test at the controller. Continuing at 390, method 300 includes opening the canister vent valve. In this way, the fuel system pressure may be equilibrated to atmospheric pressure.

At 392, method 300 includes indicating degradation of the fuel system. In other words, method 300 comprises indicating degradation of the fuel tank responsive to an absolute fuel tank pressure less than a threshold. Indicating fuel tank degradation may include setting a flag at the controller and activating an MIL to indicate the vehicle operator of the presence of fuel tank degradation. Accordingly, method 300 proceeds to 394, wherein method 300 includes adjusting engine operating parameters. Adjusting engine operating parameters may include adjusting a maximum engine load to reduce fuel consumption, adjusting a commanded A/F ratio, operating the vehicle in battery-only mode during certain conditions, etc. Method 300 may then end.

FIG. 4 shows an example timeline 400 for an EONV test with fuel level enablement compensation. Timeline 400 includes plot 410, indicating the on or off status of a vehicle, over time. Timeline 400 further includes plot 420, indicating a fuel level, and plot 430, indicating ambient temperature, over time. Timeline 400 further includes plot 440, indicating MAF summation, a measure of heat rejection, over time. Line 444 represents a threshold MAF summation based on a fuel level and ambient temperature indicated at time $t_1$, and line 448 represents a threshold MAF summation based on a fuel level and ambient temperature indicated at time $t_3$. Timeline 400 further includes plot 450, indicating an open or closed status of a canister vent valve, over time. Timeline 400 further includes plot 460, indicating fuel tank pressure, over time. Line 462 represents a threshold for the pressure rise portion, and line 464 represents a vacuum threshold for the vacuum portion, of an EONV test, the thresholds are a function of the difference between the MAF summation at a vehicle-off event and the MAF threshold indicated by line 444. Line 466 represents a threshold for the pressure rise portion, and line 468 represents a vacuum threshold for the vacuum portion, of an EONV test, the thresholds a function of the difference between MAF summation at a vehicle-off event, and the MAF threshold indicated by line 448. Timeline 400 further includes plot 470, indicating whether the fuel tank degradation is present.

At time $t_0$, the vehicle is in operation, as indicated by plot 410. Accordingly, the canister vent valve is open, indicated by plot 450. Between time $t_0$ and $t_1$, the vehicle remains in operation, and thus the fuel level, indicated by plot 420, decreases, and the MAF summation, indicated by plot 440, increases. At time $t_1$, the vehicle is turned off. The threshold MAF summation required to enable entry into an EONV leak test, based on ambient temperature and fuel level, is set, indicated by line 444. Actual MAF summation, indicated by plot 440, is a measured amount greater than the threshold, thus entry into the EONV leak test is enabled, and pressure and vacuum thresholds, indicated by lines 462 and 464 respectively, are set. Accordingly, the canister vent valve is closed. Between time $t_1$ and $t_2$ pressure in the fuel tank rises, indicated by plot 460, and reaches the pressure threshold. As such, no fuel tank degradation is indicated, as shown by plot 470.

At time $t_2$ the vehicle resumes operation. Accordingly, the canister vent valve is opened, and fuel tank pressure returns to atmosphere. MAF summation, indicated by plot 440, is reset. Between time $t_2$ and $t_3$, while the vehicle is in operation, fuel level decreases, and MAF summation increases.

At time $t_3$ the vehicle is turned off. The threshold MAF summation required to enable entry into an EONV leak test, based on ambient temperature and fuel level, is set, indicated by line 448. As the fuel level is lower at time $t_3$ compared to time $t_1$, the threshold MAF at time $t_3$ is accordingly set lower than the threshold MAF at time $t_1$. Actual MAF summation, indicated by plot 440, is a measured amount greater than the threshold, thus entry into the EONV leak test is enabled, and pressure and vacuum thresholds, indicated by lines 466 and 468 respectively, are set. Accordingly, the canister vent valve is closed. Between time $t_3$ and $t_4$ pressure in the fuel tank rises, indicated by plot 460, but does not reach the pressure threshold. As such, the canister vent valve is opened at time $t_4$, and the fuel tank pressure is allowed to stabilize to atmospheric pressure between time $t_4$ and $t_5$.

At time $t_5$, the canister vent valve is closed, and the vacuum portion of the EONV test begins. Between time $t_5$ and $t_6$, vacuum builds in the fuel tank, but does not reach the threshold vacuum, indicated by line 468 prior to reaching a plateau. Accordingly, at time $t_6$, fuel tank degradation is indicated. As the leak test is complete, the canister vent valve is opened to relieve fuel tank vacuum, and MAF summation is reset.

The system described herein and with reference to FIG. 1, along with the method described herein and with reference to FIG. 3 may enable one or more systems and one or more methods. In one example, a method for an evaporative emissions system is presented. The method comprises adjusting a threshold for an evaporative emissions leak test entry condition based on at least a fuel level, responsive to the evaporative emissions leak test entry condition being greater than the adjusted threshold, adjusting a parameter of the evaporative emissions leak test based on the evaporative emissions leak test entry condition, and indicating degradation based on the adjusted parameter. In this example, or any other example, the method may additionally or alternatively comprise adjusting the threshold for the evaporative emissions leak test entry condition based on an ambient temperature. In this example, or any other example, the evaporative emissions leak test entry condition may additionally or alternatively comprise an engine heat rejection inference during an engine run time duration. In this example, or any other example where the evaporative emissions leak test entry condition comprises an engine heat rejection inference during an engine run time duration, the engine run time duration may additionally or alternatively be a total engine run time between a most recent vehicle-off event and a previous vehicle-on event. In this example, or any other example where the evaporative emissions leak test entry condition comprises an engine heat rejection inference, the engine heat rejection inference may additionally or alternatively be based on at least an engine intake mass air flow summation between the most recent vehicle-off event and the previous vehicle-on event. In this example, or any other example where the evaporative emissions leak test entry condition comprises an engine heat rejection inference, the engine heat rejection inference may additionally or alternatively be based on at least a number of miles driven between the most recent vehicle-off event and the previous vehicle-on event. In this example, or any other example where the evaporative emissions leak test entry condition comprises an engine heat rejection inference during an engine run time duration, the method may additionally or alternatively comprise initiating the evaporative emissions leak test only when the engine heat rejection inference is greater than the adjusted threshold. In this example, or any other example, the evaporative emissions leak test may additionally or alternatively be an engine-off natural vacuum test. In this example, or any other example wherein the evaporative emissions leak test is an engine-off natural vacuum test, the evaporative emissions leak test parameter may additionally or alternatively be a pressure rise threshold for the engine-off natural vacuum test. In this example, or any other example wherein the evaporative emissions leak test is an engine-off natural vacuum test, the evaporative emissions leak test parameter may additionally or alternatively be a vacuum threshold for the engine-off natural vacuum test. In this example, or any other example, the method may additionally or alternatively comprise adjusting one or more evaporative emissions system operating parameters responsive to an indication of degradation. In this example, or any other example where one or more evaporative emissions system operating parameters are adjusted responsive to an indication of degradation, the one or more evaporative emissions system operating parameters may additionally or alternatively comprise a fuel vapor canister purge schedule. The technical result of implementing this method is an increased rate of in use monitoring performance (IUMP). In North America, IUMP rates must exceed 52%, otherwise a vehicle model may be recalled or warranty work may be specified for specific vehicles. By adjusting evaporative emissions leak test entry conditions based on a fuel level, the evaporative emissions leak test may be performed in scenarios where it would otherwise be aborted or not be initiated, such as when a fuel level is relatively low, and a drive cycle is relatively short.

In another example, a method for an evaporative emissions system is provided. The method comprises determining an engine heat rejection inference for an engine run time duration following a vehicle off event, adjusting an engine heat rejection inference entry threshold based on a current fuel level and a current ambient temperature, adjusting one or more pressure thresholds for an engine-off natural vacuum test based on the engine heat rejection inference responsive to the engine heat rejection inference being greater than the adjusted entry threshold, isolating the evaporative emissions system from atmosphere, and indicating degradation of the evaporative emissions system based on the one or more adjusted pressure thresholds. In this example, or any other example, the engine heat rejection inference may additionally or alternatively be based on at least an engine intake mass air flow summation, and the engine run time duration may additionally or alternatively comprise an engine run time between the vehicle-off event and a previous vehicle-on event. In this example, or any other example, adjusting an engine heat rejection inference entry threshold based on a current fuel level and current ambient temperature may additionally or alternatively comprise decreasing the engine heat rejection inference entry threshold as fuel level decreases, and increasing the engine heat rejection inference entry threshold as ambient temperature decreases. In this example, or any other example, adjusting an engine heat rejection inference entry threshold may additionally or alternatively comprise retrieving a 3D lookup table stored in a powertrain control module. In this example, or any other example, adjusting one or more pressure thresholds for an engine-off natural vacuum test based on the engine heat rejection inference may additionally or alternatively comprise indicating a difference between a measured engine heat rejection inference and an adjusted engine heat rejection inference entry threshold, and adjusting the one or more pressure thresholds based on a magnitude of the indicated difference. The technical result of implementing this method is a reduction in false-failures of an engine-off natural vacuum test. By adjusting an engine heat rejection threshold based on a current fuel level and a current ambient temperature, the engine-off natural vacuum test will not be executed under conditions where the fuel tank is unlikely to generate a threshold amount of pressure or vacuum required to discern the integrity of the fuel tank. Further, by adjusting the pressure thresholds based on the heat rejection inference, the accuracy and robustness of the test may be increased, further decreasing false-failures, while also decreasing false-pass results.

In yet another example, a vehicle system is provided, the vehicle system comprising a fuel system isolatable from atmosphere via one or more valves, a fuel level indicator, and a controller configured with instructions stored in non-transitory memory, that when executed, cause the controller to: adjust an entry threshold for an engine heat rejection inference based at least in part on a fuel level, following a vehicle-off event, responsive to an engine heat rejection inference for a vehicle run time duration between the vehicle-off event and a previous vehicle-on event being greater than the adjusted entry threshold, adjust one or more pressure thresholds for an engine-off natural vacuum test based on the engine heat rejection inference, isolate the fuel system from atmosphere, and indicate degradation of the fuel system based on the one or more adjusted pressure thresholds. In this example, or any other example, the entry threshold for the engine heat rejection inference may additionally or alternatively be based at least in part on an ambient temperature. In this example, or any other example, the controller may additionally or alternatively be configured with instructions stored in non-transitory memory, that when executed, cause the controller to: initiate the engine-off natural vacuum test only when the engine heat rejection inference is greater than the adjusted threshold. The technical result of implementing this vehicle system is a reduction in vehicle emissions and vehicle warranty costs. By adjusting an entry threshold for an engine heat rejection inference based on a fuel level, the engine off natural vacuum test may be performed in scenarios where it would otherwise be aborted, thus increasing the rate of execution, and allowing for degradation to be indicated more rapidly than for vehicle systems that do not adjust entry thresholds.

Further, by adjusting pressure thresholds based on the engine heat rejection inference, false-failures may be decreased, thus reducing the warranty costs for vehicles by reducing erroneous malfunction indicator lamp illumination.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an evaporative emissions system, comprising:
    adjusting a threshold for an evaporative emissions leak test entry condition that comprises an engine heat rejection inference for an engine run time duration, based on at least a fuel level;
    responsive to the engine heat rejection inference being greater than the adjusted threshold, adjusting one or more pressure thresholds for an evaporative emissions leak test based on the engine heat rejection inference; and
    indicating degradation of the evaporative emissions system based on the adjusted one or more pressure thresholds.

2. The method of claim 1, further comprising:
    adjusting the threshold for the engine heat rejection inference based on an ambient temperature.

3. The method of claim 1, wherein the engine run time duration is a total engine run time between a most recent vehicle-off event and a previous vehicle-on event.

4. The method of claim 3, where the engine heat rejection inference is based on at least an engine intake mass air flow summation between the most recent vehicle-off event and the previous vehicle-on event.

5. The method of claim 3, wherein the engine heat rejection inference is based on at least a number of miles driven between the most recent vehicle-off event and the previous vehicle-on event.

6. The method of claim 1, further comprising:
    initiating the evaporative emissions leak test only when the engine heat rejection inference is greater than the adjusted threshold.

7. The method of claim 1, wherein the evaporative emissions leak test is an engine-off natural vacuum test.

8. The method of claim 7, wherein the one or more pressure thresholds is a pressure rise threshold for the engine-off natural vacuum test.

9. The method of claim 7, wherein the one or more pressure thresholds is a vacuum threshold for the engine-off natural vacuum test.

10. The method of claim 1, further comprising:
    adjusting one or more evaporative emissions system operating parameters responsive to an indication of degradation.

11. The method of claim 10, wherein the one or more evaporative emissions system operating parameters comprise a fuel vapor canister purge schedule.

* * * * *